United States Patent [19]

Bierman et al.

[11] Patent Number: 4,461,746

[45] Date of Patent: Jul. 24, 1984

[54] REDUCTION OF IRON IN A REDUCTIVE STRIPPING PROCESS FOR THE RECOVERY OF URANIUM FROM WET PROCESS PHOSPHORIC ACID

[75] Inventors: Laurence W. Bierman; Samual M. Polinsky, both of Pocatello, Id.

[73] Assignee: J. R. Simplot Co., Boise, Id.

[21] Appl. No.: 349,026

[22] Filed: Feb. 16, 1982

[51] Int. Cl.³ .............................................. C01G 43/00
[52] U.S. Cl. .......................................... 423/8; 423/10
[58] Field of Search ................. 423/6, 8, 9, 10, 321 R

[56] References Cited

U.S. PATENT DOCUMENTS

| | | |
|---|---|---|
| 3,214,230 | 10/1965 | Hazen et al. . |
| 3,214,239 | 10/1965 | Hazen et al. .......................... 423/10 |
| 3,711,591 | 1/1973 | Hurst et al. . |
| 3,966,873 | 6/1976 | Elikan et al. . |
| 4,105,741 | 8/1978 | Wiewiorowski et al. . |
| 4,180,545 | 12/1979 | McCullough et al. . |
| 4,202,860 | 5/1980 | Miyake et al. .......................... 423/6 |
| 4,241,027 | 12/1980 | Bowerman et al. . |
| 4,255,392 | 3/1981 | Chiang . |
| 4,302,247 | 11/1981 | Berry et al. .......................... 423/10 |

Primary Examiner—O. R. Vertiz
Assistant Examiner—Gregory A. Heller
Attorney, Agent, or Firm—Fulwider, Patton, Rieber, Lee & Utecht

[57] ABSTRACT

A two stage reductive stripping process for recovering uranium from wet process phosphoric acid, wherein the ferrous ions required for the first-stage reductive strip are supplied by heating a portion of acid raffinate phosphoric acid from the first-stage extraction in the presence of pressurized hydrogen gas. The pressurized hydrogen gas reduces the ferric ions in the raffinate to the ferrous state without any addition of metallic iron or other impurity, so that the uranium-enhanced reductive strip solution supplied to the second stage from the first stage reductive strip has a low concentration of iron impurity, and no further purification to remove iron impurity is required.

7 Claims, 1 Drawing Figure

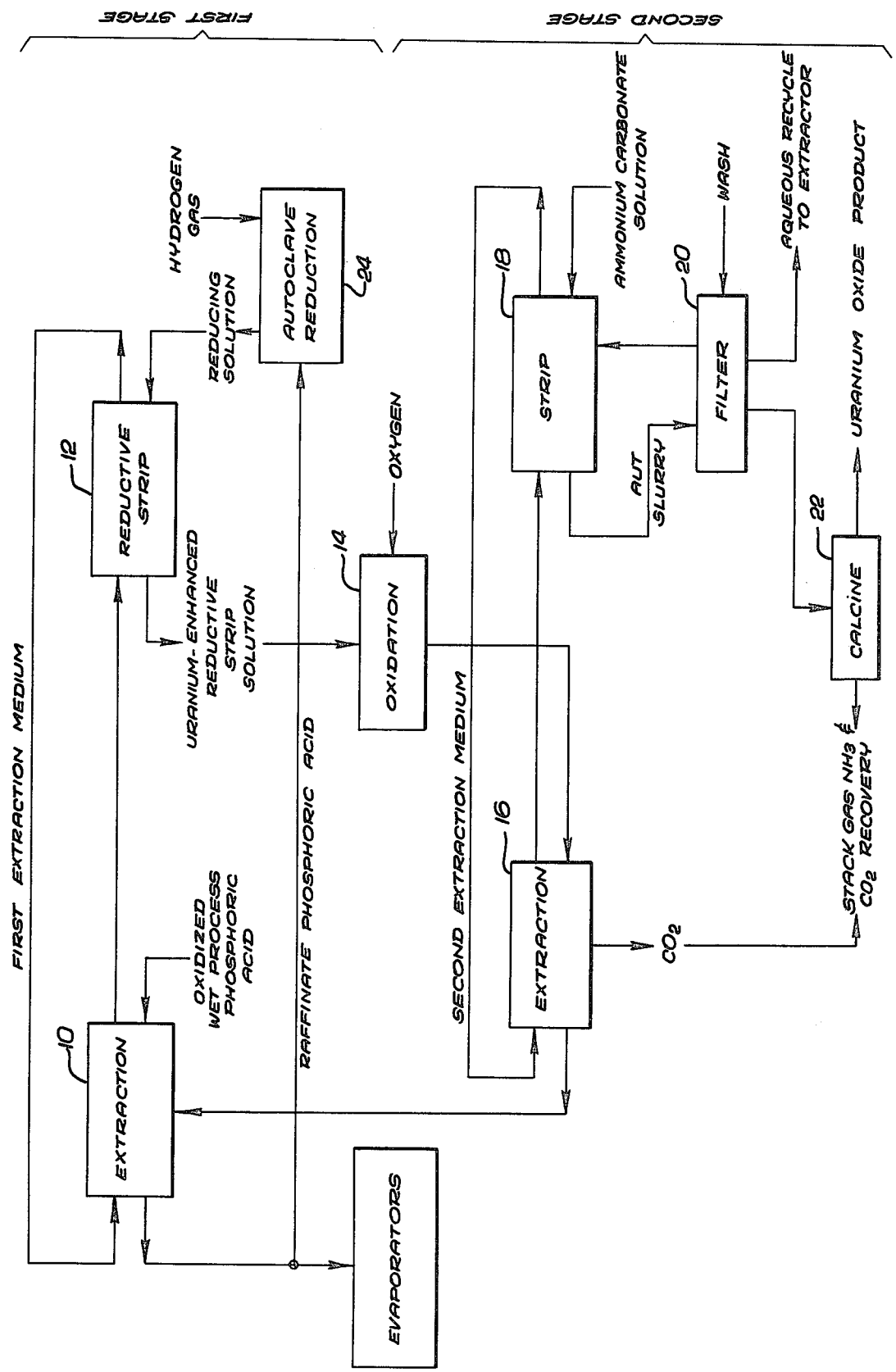

REDUCTION OF IRON IN A REDUCTIVE STRIPPING PROCESS FOR THE RECOVERY OF URANIUM FROM WET PROCESS PHOSPHORIC ACID

BACKGROUND OF THE INVENTION

This invention relates generally to a two-stage process for the reductive stripping of uranium from wet-process phosphoric acid, and more particularly, to providing the ferrous ions necessary for the reductive strip in the first stage without contaminating the uranium-enhanced reductive strip solution supplied to the second stage with undesirable impurity elements such as excess iron.

Phosphates for use in the fertilizer industry are obtained by mining phosphate-bearing rock and then converting the rock to an agriculturally useful fertilizer product by one of several alternative processes. In one of these processes, the "wet process", the mined rock is digested in sulfuric acid to produce dilute phosphoric acid and then concentrated to product grade phosphoric acid by evaporation. The phosphate bearing rock may contain several kinds of metallic elements in relatively low concentration which are also dissolved into the phosphoric acid, and these metallic elements may be removed from the acid either as valuable by-products or as undesirable contaminants.

Depending upon the specific type of phosphate rock, uranium may be present in the dilute wet-process phosphoric acid in an amount sufficient to warrant recovery of the uranium for use in the nuclear industry. Several processes for recovering uranium from wet process phosphoric acid are known, and in one such process disclosed in U.S. Pat. No. 3,711,591 the chemical properties of various oxidation states of the uranium ion are utilized to allow extraction of the uranium values by contacting the phosphoric acid with particular extractants dissolved in an organic solvent. This process functions more efficiently if the uranium content in the input feed is initially concentrated in a first stage, wherein the extractant in the organic solvent extracts uranium values from the wet-process phosphoric acid having a very low uranium concentration, and then transfers the uranium values to a uranium-enhanced reductive strip solution used as input to the second stage, by a reductive strip wherein ferrous ions reduce the oxidation state of the uranyl ions. The reduced uranous ions then transfer from the organic-based phase to the aqueous uranium-enhanced reductive strip solution. In existing processes of this type, ferrous ions for use in the first stage reductive strip are provided by treating a portion of the raffinate phosphoric acid from the extraction by the addition of iron metal, which reduces the ferric ions in the raffinate to the ferrous state.

Reduction of the ferric ions in the raffinate by the addition of metallic iron has the significant disadvantage of increasing the concentration of iron in the uranium-enhanced reductive strip solution which serves as the input to the second stage of the recovery process. The iron is extracted together with the uranium in the second stage, and the extracted iron contaminates the concentrated uranium oxide product, acting to complicate the subsequent purification of the uranium oxide product into a form usable in the nuclear industry. To overcome this problem of increased iron concentrations in the uranium-enhanced reductive strip solution, processes have been developed wherein the iron is removed prior to the second stage extraction by precipitation, or the second-stage extraction process itself may be modified to avoid extraction of the iron. In either approach to removing the iron, there are economic disadvantages in that costly chemicals or expensive capital equipment are required.

Accordingly, there has been a need for an alternative approach to providing ferrous ions to be used in the first stage reductive strip which eliminates the disadvantages produced by the addition of iron metal or other chemical reducing agent to the raffinate phosphoric acid. Preferably, the improved process would utilize the same basic process approach as the existing two-stage reductive stripping process for recovering uranium from wet process phosphoric acid, which has been proved to be reasonably efficient. The present invention fulfills this need, and further provides related advantages.

SUMMARY OF THE INVENTION

The present invention resides in a process for recovering uranium values from wet process phosphoric acid, by reductive stripping of uranium values from the acid using extractants in an organic solvent. In the first stage the uranium content of the acid is enhanced by a reductive strip wherein ferrous ions produced by autoclaving raffinate phosphoric acid in the presence of a pressurized reducing gas strip uranyl ions from the extractant into a uranium-enhanced reductive strip solution. The production of ferrous ions by exposing raffinate phosphoric acid to the pressurized reducing gas in an autoclave does not introduce excess iron metal as in conventional operations, thereby avoiding the contamination of the uranium-enhanced reductive strip solution fed to the second stage and in turn avoiding the contamination of the final extracted uranium product by excess iron, thereby reducing refinement requirements in the ultimate uranium purification process.

In accordance with the invention, raffinate phosphoric acid, produced by the first-stage extraction and containing a low concentration of ferric ions, is heated in contact with a reducing gas to reduce the ferric ions therein to the ferrous state, so that the resulting reducing solution may serve as a source of ferrous ions in the reductive strip of the first stage, wherein uranyl ions are reduced to uranous ions and transferred from the extractant and organic solvent to the aqueous uranium-enhanced reductive strip solution. In the presently preferred embodiment, the raffinate phosphoric acid is heated in contact with pressurized hydrogen gas in an autoclave to accomplish the reduction of the ferric ions, preferably at a pressure of up to about 15 atmospheres hydrogen and at a temperature of from about 150° F. to about 450° F., and most preferably at a pressure of from about 3 to about 7 atmospheres hydrogen gas and a temperature of from about 250° F. to about 300° F., for a period of time of about 5 to about 15 minutes. Other reducing gasses such as sulfur dioxide, carbon monoxide, methane, and hydrogen sulfide may also advantageously be used. The valence states of other ions present in the acid also are reduced by the reducing gas and may be used in subsequent processing steps.

No excess iron metal or other solid reducing agent is introduced into the raffinate phosphoric acid to accomplish the reduction of ferric ions, so that the uranium-enhanced reductive strip solution produced by the reductive strip has a relatively low concentration of iron and other impurities, thereby reducing the subsequent refinement requirements in processing the uranium found in the uranium-enhanced reductive strip solution to a final commercially usable uranium product. In its most commercially practical form, the second-stage process undesirably strips iron impurities into the final uranium product of this process, thereby contaminating the final product with a proportion of any iron metal found in the uranium-enhanced reductive strip solution. Therefore, accomplishing the reduction of ferric ions with a reducing gas rather than a solid reducing agent significantly enhances the final product.

It will be appreciated from the foregoing that the present invention represents an advance in the field of reductive stripping processes for recovering uranium from wet process phosphoric acid. With this improvement, the necessary ferrous ions required in the first-stage reductive strip are created without introducing an iron impurity, which is otherwise stripped in the second stage to contaminate the final uranium product.

Other features and advantages of the present invention will become apparent from the following more detailed description, taken in conjunction with the accompanying drawing, which illustrates, by way of example, the principles of the invention.

BRIEF DESCRIPTION OF THE DRAWING

The FIGURE is a schematic flow diagram of a two-stage reductive stripping process for recovering uranium from wet process phosphoric acid, illustrating the reduction of ferric to ferrous ions by pressurized hydrogen gas in the first stage, in accordance with a preferred embodiment of the present invention.

DETAILED DESCRIPTION OF THE PREFERRED EMBODIMENT

As shown in the FIGURE for purposes of illustrating the presently preferred embodiment, the present invention is concerned with a two-stage reductive stripping process for recovering uranium from wet process phosphoric acid and, more particularly, to a particular step in the first stage of this process wherein ferrous ions must be created for introduction into a reductive strip. In the first stage of this process, a uranium-enhanced reductive strip solution having an enhanced uranium concentration is produced from oxidized wet-process phosphoric acid having a low concentration of uranium by an extraction 10 of a portion of the uranium content into a first extraction medium, and a subsequent reductive strip 12 of this extraction medium by reaction with ferrous ions. The uranium-enhanced reductive strip solution is then treated by an oxidation 14 and introduced into a second-stage extraction 16 and subsequent strip 18, wherein the stripped uranium output is of sufficient concentration that it may be filtered by a filter 20 and calcined in a calcine unit 22 to produce a uranium oxide product.

A single-stage stripping process for producing uranium product from wet process phosphoric acid operates somewhat inefficiently because of the very low uranium concentration typically found in wet process phosphoric acid. As described in detail in U.S. Pat. No. 3,711,591, a two stage reductive stripping process was devised, wherein the extraction 10 and the reductive strip 12 of the first stage concentrated the uranium in the input flow to the second stage to an extent that the extraction 16 and the strip 18 may operate more efficiently, thereby raising the overall extraction efficiency of the process.

Briefly, oxidized wet-process phosphoric acid having the uranium in the oxidized uranyl ion form is introduced into the extraction 10, wherein a portion of the uranyl ions are extracted into the first extraction medium, which carries the uranyl ions to the reductive strip 12. The uranium-depleted raffinate phosphoric acid passes to evaporators 13 for use in agricultural fertilizer production. A small fraction of the raffinate phosphoric acid is diverted, processed to reduce the ferric ions therein to the ferrous state, and introduced as a reducing solution into the reductive strip 12 to serve as a source of ferrous ions to reduce the uranyl ions in the extraction medium to the uranous state, in which oxidation state the uranous ions are rejected from the first extraction medium into the aqueous reducing solution to produce a uranium-enhanced reductive strip solution. (As used herein, the term "ferrous" denotes iron ions in the $+2$ oxidation state, the term "ferric" denotes iron ions in the $+3$ oxidation state, the term "uranyl" denotes uranium ions in the $+6$ oxidation state, and the term "uranous" denotes uranium ions in the $+4$ oxidation state.)

In the second stage, the uranium-enhanced reductive strip solution output of the first stage is oxidized by oxygen gas in the oxidation 14, to convert the uranous ions therein to the uranyl state, and then introduced into the extraction 16 wherein the uranyl ions are transferred to a second extraction medium and the depleted oxidized reductive strip solution is recycled into the first extraction 10. The second extraction medium transfers the uranium values to the second-stage strip 18, wherein the uranyl ions are stripped from the second extraction medium by a reaction with ammonium carbonate solution to recover the uranium values as ammonium uranyl tricarbonate (AUT). The AUT slurry is then washed, filtered and calcined to yield a uranium oxide final product suitable for further treatment to produce purified uranium for use in the nuclear industry. Gasses from the extraction 16 and the calcine 22 are vented as stack gas, and aqueous waste from the filter 20 is cleaned in an extractor.

The extraction medium used in both the first-stage extraction and the second-stage extraction should be one that extracts uranyl ion from and gives up uranous ion to an aqueous phase. As disclosed in U.S. Pat. No. 3,711,591, an example of a satisfactory extraction medium is di (2-ethylhexyl) phosphoric acid and trioctylphosphine oxide dissolved in an organic diluent.

In accordance with the invention and as illustrated for the presently preferred autoclave reduction with hydrogen gas, in the first stage the ferric ions in the diverted raffinate phosphoric acid are reduced to the ferrous state required for the reductive strip 12 by an autoclave reduction 24. The diverted raffinate phosphoric acid is introduced into an autoclave pressure vessel and heated under hydrogen gas pressure, with continuous agitation. The reduction of ferric ions therein by hydrogen should proceed until a concentration of ferrous ions sufficient for the reductive strip 12 is obtained. In typical commercial-scale operation of the two-stage reductive stripping process described in U.S. Pat. No. 3,711,591 the oxidized wet-process phosphoric acid flows at 1000 l/min and gives up 0.07 g U/l to the first extraction medium, the first extraction medium flows at 500 l/min, and 6 l/min of raffinate phosphoric acid is withdrawn for introduction into the reductive strip. To effect the reductive strip under these conditions, a concentration of ferrous ions of about 5 to about 20 grams per liter in the reducing solution is required. Although the reduction of the ferric ions by hydrogen will proceed more rapidly with increasing pressures of hydrogen, as a practical matter a maximum hydrogen pressure of about 7 atmospheres is utilized to avoid the capital expense of providing a high-pressure autoclave. Preferably, the raffinate phosphoric acid is heated to a temperature of from about 150° F. to about with a hydrogen pressure of from about 1 to about 15 atmospheres. Most preferably, the raffinate phosphoric acid is heated to a temperature of from about 250° F. to about 300° F., with a hydrogen pressure of from about 3 to about 7 atmospheres for a time of from about 5 to about 15 minutes. Under these conditions, as an Example will demonstrate, the autoclave reduction 24 will provide the necessary 5-20 grams per liter of ferrous ion, with the reduction of ferric ion by hydrogen approaching completion.

The following Example will serve to illustrate the inventive method:

EXAMPLE

Eleven liters of 30% $P_2O_5$ phosphoric acid was introduced into a mechanically agitated pressure vessel serving as an autoclave and heated to 295° F. under 6 atmospheres hydrogen gas pressure to effect reduction of the ferric ions in the phosphoric acid to the ferrous state. Samples of the acid were taken at predetermined time intervals up to 2 hours and titrated using 0.02 M ceric ammonium acid sulfate solution to determine the presence of ferrous ion. The titration analysis of the acid samples are summarized in the following table:

| Time (Minutes) | Meq/L Oxidation Requirement | Grams/L Ferrous Ion |
|---|---|---|
| 0 | 77.0 | 4.3 |
| 5 | 110.2 | 6.2 |
| 15 | 189.7 | 10.6 |
| 20 | 213.4 | 11.9 |
| 30 | 223.6 | 12.5 |
| 45 | 244.2 | 13.6 |
| 60 | 249.0 | 13.9 |
| 75 | 267.8 | 15.0 |
| 120 | 284.6 | 15.9 |

In about 5-15 minutes, the hydrogen reduction produces an acid of sufficient ferrous ion content for use in a reducing solution to strip the uranyl ions from the extraction medium in the first stage. As seen from the table, after about 20-30 minutes the reduction reaction has proceded essentially to completion under the combination of pressure and temperature used in the Example, and further reduction is not economically justified in commercial processing.

It will now be appreciated that, through the use of this invention, the necessary concentration of ferrous ions may be produced in raffinate phosphoric acid to effect the reductive strip of the first stage in a two-stage process for reductive stripping to recover uranium from wet process phosphoric acid. The reduction of the ferric ion to the ferrous state is accomplished by a reducing gas rather than the introduction of iron metal, which, if used, would eventually be extracted into the final uranium oxide product and act as a contaminant to reduce the efficiency of further refinement steps. Hydrogen gas is the presently preferred reducing gas for use in this invention, but other reducing gasses, such as sulfur dioxide, carbon monoxide, methane, and hydrogen sulfide, may also be used. And, while in the described embodiment of the invention it is the ferric-to-ferrous reduction that is desired, other ions in the phosphoric acid may be reduced by the reducing gas and advantageously used in subsequent processing reactions. Although a particular embodiment of the invention has been described in detail for purposes of illustration, various modifications may be made without departing from the spirit and scope of the invention. Accordingly, the invention is not to be limited except as by the appended claims.

We claim:

1. A reductive stripping process for the recovery of uranium from wet process phosphoric acid, comprising the steps of:

providing oxidized wet-process phosphoric acid having a dilute concentration of uranyl ions and ferric ions therein;

extracting a portion of the uranyl ions in the oxidized wet-process phosphoric acid into an extraction medium, thereby producing a raffinate phosphoric acid depleted in uranium but having a dilute concentration of ferric ions;

reacting a portion of said raffinate phosphoric acid with a pressurized reducing gas to reduce the ferric ions therein to the ferrous state to produce a reducing solution having a ferrous ion concentration sufficient to strip uranyl ions from said extraction medium;

stripping uranyl ions from said extraction medium with said reducing solution to produce a uranium-enhanced reductive strip solution suitable for further processing to remove uranium; and further processing said uranium-enhanced reductive strip solution into a uranium oxide product.

2. The process of claim 1, wherein said reacting step is performed in a pressurized autoclave.

3. The process of claim 1, wherein said reducing gas is hydrogen.

4. The process of claim 1, wherein said reacting step is accomplished in an autoclave having a pressure of up to about 15 atmospheres hydrogen gas, at a temperature of from about 150° F. to about 450° F.

5. The process of claim 1, wherein said reacting step is accomplished in an autoclave pressurized to from about 3 to about 7 atmospheres hydrogen gas, at a temperature of from about 250° F. to about 300° F. for a period of time of from about 5 to about 15 minutes.

6. The process of claim 1, wherein said reducing gas is selected from the group consisting of sulfur dioxide, carbon monoxide, methane, and hydrogen sulfide.

7. The reductive stripping process of claim 1, wherein said further processing step comprises the individual steps of:

oxidizing said uranium-enhanced reductive strip solution to produce uranyl ions therein;

extracting a portion of the uranyl ions from the oxidized uranium-enhanced reductive strip solution into a second extraction medium;

stripping a portion of the uranium values from said second extraction medium with an ammonium carbonate solution to produce a slurry containing uranium compounds; and filtering and calcining said slurry to produce a uranium oxide product suitable for further processing.

* * * * *